United States Patent [19]

Patil

[11] Patent Number: 5,439,607
[45] Date of Patent: Aug. 8, 1995

[54] MULTIFUNCTIONAL VISCOSITY INDEX IMPROVER-DISPERSANT ANTIOXIDANT

[75] Inventor: Abhimanyu O. Patil, Westfield, N.J.

[73] Assignee: Exxon Chemical Patents Inc., Linden, N.J.

[21] Appl. No.: 175,917

[22] Filed: Dec. 30, 1993

[51] Int. Cl.$^6$ .......................................... C10N 145/00
[52] U.S. Cl. ........................ 252/51.5 R; 252/51.5 A; 525/132; 525/327.6; 525/379; 525/381; 525/382
[58] Field of Search ................. 252/51.5 R, 51.5 A; 525/132, 327.6, 379, 381, 382; 44/394, 395, 415

[56] References Cited

U.S. PATENT DOCUMENTS

| | | | |
|---|---|---|---|
| 3,172,892 | 3/1965 | LeSuer et al. | 260/326.5 |
| 3,215,707 | 11/1965 | Rense | 260/326.3 |
| 3,231,587 | 1/1966 | Rense | 260/346.5 |
| 3,272,746 | 9/1966 | LeSuer et al. | 252/47.5 |
| 3,316,177 | 4/1967 | Dorer, Jr. | 252/51.5 |
| 3,326,804 | 6/1967 | Hu | 252/34 |
| 3,361,673 | 1/1968 | Stuart et al. | 252/51.5 |
| 3,401,118 | 9/1968 | Renoir, Jr. | 252/51.5 |
| 3,558,743 | 1/1971 | Verdol et al. | 525/132 |
| 3,912,764 | 10/1975 | Palmer, Jr. | 260/346.8 |
| 4,089,794 | 5/1978 | Engel et al. | 252/51.5 A |
| 4,101,434 | 7/1978 | Edwards et al. | 252/52 R |
| 4,110,349 | 8/1978 | Cohen | 260/346.74 |
| 4,132,661 | 1/1979 | Waldbillig et al. | 252/51.5 A |
| 4,137,185 | 1/1979 | Gardiner et al. | 252/33 |
| 4,144,181 | 3/1979 | Elliott et al. | 252/33 |
| 4,160,739 | 7/1979 | Stambaugh et al. | 252/34 |
| 4,169,063 | 9/1979 | Kovisky | 252/51.5 A |
| 4,171,273 | 10/1979 | Waldbillig et al. | 252/51.5 A |
| 4,219,432 | 8/1980 | Girgenti et al. | 252/51.5 A |
| 4,234,435 | 11/1980 | Meinhardt et al. | 252/51.5 A |
| 4,248,725 | 2/1981 | Crawford et al. | 252/51.5 A |
| 4,501,595 | 2/1985 | Sung et al. | 44/57 |
| 4,517,104 | 5/1985 | Block et al. | 252/51.5 A |
| 4,668,412 | 5/1987 | Hart et al. | 252/51.5 A |
| 4,780,230 | 10/1988 | Liu et al. | 252/51.5 R |
| 4,798,678 | 1/1989 | Liu et al. | 252/50 |
| 4,808,325 | 2/1989 | Song et al. | 252/51.5 A |
| 4,812,261 | 3/1989 | Liu et al. | 252/51.5 A |
| 4,877,834 | 10/1989 | Liu et al. | 525/66 |
| 4,904,404 | 2/1990 | Liu et al. | 252/51.5 A |
| 4,919,684 | 4/1990 | Nalesnik et al. | 44/62 |
| 4,986,924 | 1/1991 | Germanaud et al. | 252/51.5 A |
| 5,288,418 | 2/1994 | Farng et al. | 252/49.9 |

FOREIGN PATENT DOCUMENTS 1440219 6/1976 United Kingdom .

OTHER PUBLICATIONS

Encyclopedia of Chemical Technology (Kirk & Othner)—vol. 5, pp. 898–905 Interscience Publishers, N.Y. (1950).

Primary Examiner—Prince Willis, Jr.
Assistant Examiner—Cephia D. Toomer
Attorney, Agent, or Firm—T. V. Kowalchyn

[57] ABSTRACT

Oleaginous compositions, particularly lubricating oil compositions, exhibiting improved antioxidant properties containing a viscosity index improving amount of a viscosity index improver-dispersant comprised of the reaction products of: (a) an oil soluble ethylene copolymer comprising from about 15 to 90 wt. % ethylene and from about 10 to 85 wt. % of at least one $C_3$ to $C_{28}$ alpha-olefin, having a number average molecular weight of from about 20,000 to 500,000, grafted with an ethylenically unsaturated carboxylic acid material having 1 or 2 acid or anhydride moieties; (b) an organic polyamine having at least two primary amino groups; (c) an aldehyde; (d) a hydroxy aromatic reactant having at least one —OH— group attached to the aromatic ring; and, optionally, (e) an amount effective to provide a V.I. improver-dispersant exhibiting improved low temperature viscometric properties of high functionality long chain hydrocarbyl substituted dicarboxylic acid material having a functionality of at least 1.3.

9 Claims, No Drawings

MULTIFUNCTIONAL VISCOSITY INDEX IMPROVER-DISPERSANT ANTIOXIDANT

BACKGROUND OF THE INVENTION

The concept of derivatizing viscosity index (V.I.) improving high molecular weight ethylene copolymers with acid moieties such as maleic anhydride, followed by reaction with an amine or polyol to form a V.I.-dispersant oil additive is known in the art and is described in the patent literature. This concept is described, for example, in the following patents: U.S. Pat. Nos. 3,316,177; 3,326,804; 4,089,794; 4,132,661; 4,137,185; 4,144,181; 4,160,739; 4,169,063; 4,171,273; 4,219,432; 4,517,104; French published application no. 2423530; German published application nos. P3025274.5; 2753569.9; and 2845288;

U.S. Pat. No. 4,780,230 relates to a lubricating oil composition comprising a major portion of lubricating oil and a minor amount of a reaction mixture of a carbon-carbon polymer containing an epoxide moiety grafted under 200 psig pressure and a Mannich base formed by reacting an aldehyde, a primary or secondary amine, and a hindered phenol.

U.S. Pat. No. 4,798,678 relates to a mixture of oil, an ethylene-propylene copolymer, a piperazine and a hindered phenol.

U.S. Pat. No. 4,812,261 relates to a carbon-carbon backbone polymer containing a grafted epoxide moiety which is functionalized with (a) a Mannich base formed by the reaction of an aldehyde, polyamine and a nonhindered phenol and (b) a polyamine containing at least one active hydrogen atom bonded to a nitrogen atom.

U.S. Pat. No. 4,877,834 relates to a reaction mixture of carbon-carbon polymer containing an epoxide moiety with phenol-amine-aldehyde Mannich condensate wherein said condensate is joined through a nitrogen atom to an open epoxide moiety of the polymer.

U.S. Pat. No. 4,904,404 relates to a carbon-carbon backbone polymer containing a grafted epoxide moiety which is functionalized with (a) a Mannich base formed by the reaction of an aldehyde, polyamine and a nonhindered phenol and (b) N-vinyl pyrrolidone.

SUMMARY OF THE INVENTION

The present invention is directed to multifunctional viscosity index improvers comprising the reaction products of (A) ethylene copolymers grafted with ethylenically unsaturated carboxylic acid moieties, (B) polyamines, (C) an aldehyde, (D) hydroxy aromatic compound having at least one —OH— group and, optionally, (E) a hydrocarbyl substituted dicarboxylic acid material. Oleaginous compositions containing these multifunctional viscosity index improvers, which also function as dispersants, exhibit improved viscosity stability over an extended period of time, and can further exhibit improved antioxidancy properties.

DETAILED DESCRIPTION OF THE INVENTION

In accordance with the present invention there are provided oil soluble viscosity index improver-dispersant additives comprising the reaction products of (A) ethylene copolymers, such as copolymers of ethylene and propylene, grafted with ethylenically unsaturated carboxylic acid moieties, preferably maleic anhydride moieties; (B) polyamines having two or more primary amine groups; (C) an aldehyde; (D) hydroxy aromatic compound having at least one —OH— group and, optionally, (E) a $C_8$ to $C_{500}$ hydrocarbyl substituted dicarboxylic acid material, wherein the hydrocarbyl group preferably comprises a long chain hydrocarbyl group derived from a polyolefin, most preferably poly($C_4$ alkenyl), having from about 400 to about 10,000 number average molecular weight. The V.I. improver-dispersants of the instant invention containing the phenol moieties when incorporated into oleaginous compositions such as lubricating oil compositions impart improved, (i.e., increased) storage stability, and improved antioxidant characteristics relative to similar conventional V.I.-dispersants.

ETHYLENE COPOLYMER

Oil soluble ethylene copolymers used in the invention generally will have a number average molecular weight (Mn) of from above about 20,000 to about 500,000; preferably 25,000 to 200,000 and optimally from about 20,000 to 100,000. In general, polymers useful as viscosity index improvers (also herein referred to as "V.I. improvers") will be used. These V.I. improvers will generally have a narrow range of molecular weight, as determined by the ratio of weight-average molecular weight (Mw) to number-average molecular weight (Mn). Polymers having a Mw/Mn of less than 10, preferably less than 7, and more preferably 4 or less are most desirable. As used herein (Mn) and (Mw) are measured by the well known techniques of vapor phase osmometry (VPO), membrane osmometry and gel permeation chromatography. In general, polymers having a narrow range of molecular weight may be obtained by a choice of synthesis conditions such as choice of principal catalyst and cocatalyst combination, addition of hydrogen during the synthesis, etc. Post synthesis treatment such as extrusion at elevated temperature and under high shear through small orifices, mastication under elevated temperatures, thermal degradation, fractional precipitation from solution, etc., may also be used to obtain narrow ranges of desired molecular weights and to break down higher molecular weight polymer to different molecular weight grades for V.I. use.

These polymers are prepared from ethylene and ethylenically unsaturated hydrocarbons including cyclic, alicyclic and acyclic, containing from 3 to 28 carbons, e.g., 3 to 18 carbons. These ethylene copolymers may contain from 15 to 90 wt. % ethylene, preferably 30 to 80 wt. % of ethylene and 10 to 85 wt. %, preferably 20 to 70 wt. % of one or more $C_3$ to $C_{28}$, preferably $C_3$ to $C_{18}$ more preferably $C_3$ to $C_8$, alpha olefins. While not essential, such copolymers preferably have a degree of crystallinity of less than 25 wt. %, as determined by X-ray and differential scanning calorimetry. Copolymers of ethylene and propylene are most preferred. Other alpha-olefins suitable in place of propylene to form the copolymer, or to be used in combination with ethylene and propylene to form a terpolymer, tetrapolymer, etc., include 1-butene, 1-pentene, 1-hexene, 1-heptene, 1-octene, 1-nonene, 1-decene, etc.; also branched chain alpha-olefins, such as 4-methyl-1-pentene, 4-methyl-1-hexene, 4,4-dimethyl-1-pentene, and 6-methylheptene-1, etc., and mixtures thereof.

The term copolymer as used herein, unless otherwise indicated, includes terpolymers, tetrapolymers, etc., of ethylene, said $C_{3-28}$ alpha-olefin and/or a non-conjugated diolefin or mixtures of such diolefins which may also be used. The amount of the non-conjugated diolefin will generally range from about 0.5 to 20 mole percent, preferably about 1 to about 7 mole percent, based on the total amount of ethylene and alpha-olefin present.

ETHYLENICALLY UNSATURATED CARBOXYLIC ACID MATERIAL

These materials which are grafted (attached) onto the ethylene copolymer contain at least one ethylenic bond and at least one, preferably two, carboxylic acid groups, or an anhydride group, or a polar group which is convertible into said carboxyl groups by oxidation or hydrolysis. Preferred materials are (i) monounsaturated $C_4$ to $C_{10}$ dicarboxylic acids wherein (a) the carboxyl groups are vicinyl, i.e., located on adjacent carbon atoms, and (b) at least one, preferably both, of said adjacent carbon atoms are part of said monounsaturation; or (ii) derivatives of (i) such as anhydrides or $C_1$ to $C_5$ alcohol derived mono- or diesters of (i). Upon reaction with the ethylene copolymer, the monounsaturation of the dicarboxylic acid, anhydride, or ester becomes saturated. Thus, for example, maleic anhydride becomes a hydrocarbyl substituted succinic anhydride.

Maleic anhydride or a derivative thereof is preferred as it does not appear to homopolymerize appreciably but gratis onto the ethylene copolymer to give two carboxylic acid functionalities. Such preferred materials have the generic formula

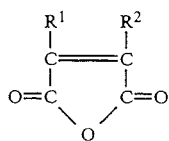

wherein $R^1$ and $R^2$ are hydrogen. Suitable examples additionally include chloro-maleic anhydride, itaconic anhydride, or the corresponding dicarboxylic acids, such as maleic acid or fumaric acid or their monoesters, etc.

GRAFTING OF THE ETHYLENE COPOLYMER

The grafting of the ethylene copolymer with the ethylenically unsaturated carboxylic acid material to form reactant (A) may be by any suitable method, such as thermally by the "ene" reaction, using copolymers containing unsaturation, such as ethylene-propylene-diene (EPDM) polymers either chlorinated or unchlorinated, extruder or masticator grafting, or more preferably it is by free-radical induced grafting in solvent, preferably in a mineral lubricating oil as solvent.

The free-radical induced grafting of ethylenically unsaturated carboxylic acid materials in solvents, such as benzene, is known in the art and disclosed, inter alia, in U.S. Pat. No. 2,236,917, incorporated herein by reference. The free-radical grafting is preferably carried out using free radical initiators such as peroxides and hydroperoxides, and nitrile compounds, preferably those which have a boiling point greater than about 100° C. and which decompose thermally within the grafting temperature range to provide said free radicals. Representative of these free-radical initiators are azobutyronitrile, 2,5-dimethyl-hex-3-yne-2, 5 bis-tertiary-butyl peroxide (sold as Lupersol 130) or its hexane analogue, di-tertiary butyl peroxide and dicumyl peroxide. The initiator is generally used at a level of between about 0.005% and about 1%, based on the total weight of the polymer solution, and temperatures of about 150 to 220° C.

The ethylenically unsaturated carboxylic acid material, preferably maleic anhydride, will be generally used in an amount ranging from about 0.01% to about 10%, preferably 0.1 to 2.0%, based on weight of the initial total solution. The aforesaid carboxylic acid material and free radical initiator are generally used in a weight percent ratio of ethylenically unsaturated carboxylic acid material to free radical initiator of about 1:1 to 30:1, preferably 3:1 to 6:1.

The initiator grafting is preferably carried out in an inert atmosphere, such as that obtained by nitrogen blanketing. While the grafting can be carried out in the presence of air, the yield of the desired graft polymer is generally thereby decreased as compared to grafting under an inert atmosphere substantially free of oxygen. The grafting time will usually range from about 0.1 to 12 hours, preferably from about 0.5 to 6 hours, more preferably 0.5 to 3 hours. The graft reaction will be usually carried out to at least approximately 4 times, preferably at least about 6 times the half-life of the free-radical initiator at the reaction temperature employed, e.g., with 2,5-dimethyl hex-3-yne-2, 5-bis(t-butyl peroxide) 2 hours at 160° C. and one hour at 170° C., etc.

In the grafting process, usually the copolymer solution is first heated to grafting temperature and thereafter said unsaturated carboxylic acid material and initiator are added with agitation, although they could have been added prior to heating. When the reaction is complete, the excess acid material can be eliminated by an inert gas purge, e.g., nitrogen sparging. Preferably the carboxylic acid material that is added is kept below its solubility limit in the polymer solution, e.g., below about 1 wt. %, preferably below 0.4 wt. % or less, of free maleic anhydride based on the total weight of polymer-solvent solution, e.g., ethylene copolymer mineral lubricating oil solution. Continuous or periodic addition of the carboxylic acid material along with an appropriate portion of initiator, during the course of the reaction, can be utilized to maintain the carboxylic acid below its solubility limits, while still obtaining the desired degree of total grafting.

In the grafting step the maleic anhydride or other carboxylic acid material used may be grafted onto both the polymer and the solvent for the reaction. Many solvents such as dichlorobenzene are relatively inert and may be only slightly grafted, while mineral oil will tend to be more grafted. The exact split of graft between the substrates present depends upon the polymer and its reactivity, the reactivity and type of solvent, the concentration of the polymer in the solvent, and also upon the maintenance of the carboxylic acid material in solution during the course of the reaction and minimizing the presence of dispersed, but undissolved acid, e.g., the maleic anhydride. The undissolved acid material appears to have an increased tendency to react to form oil insoluble materials as opposed to dissolved acid material. The split between grafted solvent and grafted polymer may be measured empirically from the infrared analyses of the product dialyzed into solvent and polymer fractions.

The grafting is preferably carried out in a mineral lubricating oil which need not be removed after the grafting step but can be used as the solvent in the subsequent reaction of the graft polymer with the amine material and as a solvent for the end product to form the lubricating additive concentrate. The oil having attached, grafted carboxyl groups, when reacted with the amine material will also be converted to the corresponding derivatives.

THE POLYAMINES

The amine component (B) which may be reacted with the grafted ethylene copolymer (A) will have two or more primary amine groups, wherein the primary amine groups may be unreacted, or wherein one of the amine groups may already be reacted.

Preferred amines are aliphatic saturated amines, including those of the general formulae:

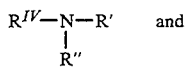 (I)

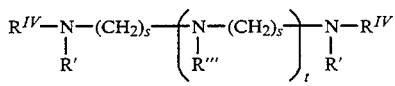 (Ia)

wherein $R^{IV}$, $R'$, $R''$ and $R'''$ are independently selected from the group consisting of hydrogen; $C_1$ to $C_{25}$ straight or branched chain alkyl radicals; $C_1$ to $C_{12}$ alkoxy $C_2$ to $C_6$ alkylene radicals; $C_2$ to $C_{12}$ hydroxy amino alkylene radicals; and $C_1$ to $C_{12}$ alkyl-amino $C_2$ to $C_6$ alkylene radicals; and wherein $R''$ and $R'''$ can additionally comprise a moiety of the formula

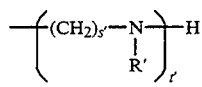 (Ib)

wherein $R'$ is as defined above, and wherein each s and s' can be the same or a different number of from 2 to 6, preferably 2 to 4; and t and t' can be the same or different and are each numbers of typically from 0 to 10, preferably about 2 to 7, most preferably about 3 to 7, with the proviso that t+t' is not greater than 10. To assure a facile reaction it is preferred that $R^{IV}$, $R'$, $R''$, $R'''$, (s), (s'), (t) and (t') be selected in a manner sufficient to provide the compounds of formula Ia with typically at least two primary amino groups. This can be achieved by selecting at least one of said $R^{IV}$, $R''$, or $R'''$ groups to be hydrogen or by letting (t) in formula Ia be at least one when $R'''$ is H or when the (Ib) moiety possesses a primary a amino group.

Non-limiting examples of suitable amine compounds include: 1,2-diaminoethane; 1,3-diaminopropane; 1,4-diamino-butane; 1,6-diaminohexane; polyethylene amines such as diethylene triamine; triethylene tetramine; tetraethylene pentamine; polypropylene amines such as di-(1,2-propylene) diamine; di-(1,2-propylene) triamine; di-(1,3-propylene) triamine; N,N-dimethyl-1,3-diaminopropane; N,N-di-(2-aminoethyl) ethylene diamine; N,N-di(2-hydroxyethyl)-1,3-propylene diamine; N-dodecyl-1,3-propane diamine; and mixtures thereof.

Commercial mixtures of amine compounds may advantageously be used. For example, one process for preparing alkylene amines involves the reaction of an alkylene dihalide (such as ethylene dichloride or propylene dichloride) with ammonia, which results in a complex mixture of alkylene amines wherein pairs of nitrogens are joined by alkylene groups, forming such compounds as diethylene triamine, triethylenetetramine, tetraethylene pentamine and corresponding piperazines. Low cost poly(ethyleneamine) compounds averaging about 5 to 7 nitrogen atoms per molecule are available commercially under trade names such as "Polyamine H", "Polyamine 400", "Dow Polyamine E-100", etc.

Useful amines also include polyoxyalkylene polyamines such as those of the formulae:

$$NH_2-\text{alkylene}-(-O-\text{alkylene-})_m-NH_2 \quad (III)$$

where m has a value of about 3 to 70 and preferably 10 to 35; and $$R^V-[\text{-alkylene}-(-o-\text{alkylene})_n-NH_2]_a \quad (IV)$$

where n has a value of about 1 to 40, with the provision that the sum of all the n's is from about 3 to about 70, and preferably from about 6 to about 35, and $R^V$ is a substituted saturated hydrocarbon radical of up to 10 carbon atoms, wherein the number of substituents on the $R^V$ group is from 3 to 6, and "a" is a number from 3 to 6 which represents the number of substituents on $R^V$. The alkylene groups in either formula (III) or (IV) may be straight or branched chains containing about 2 to 7, and preferably about 2 to 4 carbon atoms.

Particularly preferred polyamine compounds are the polyoxyalkylene polyamines of Formulae III and IV, and the alkylene polyamines represented by the formula

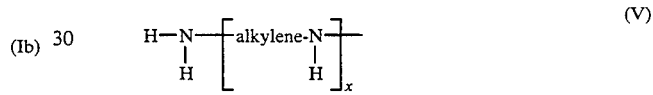 (V)

wherein x is an integer of about 1 to 10, preferably about 2 to 7, and the alkylene radical is a straight or branched chain alkylene radical having 2 to 7, preferably about 2 to 4 carbon atoms.

Examples of the alkylene polyamines of formula (V) include methylene amines, ethylene amines, butylene amines, propylene amines, pentylene amines, hexylene amines, heptylene amines, octylene amines, other polymethylene amines, the cyclic and higher homologs of these amines such as the piperazines, the amino-alkyl-substituted piperazines, etc. These amines include, for example, ethylene diamine, diethylene triamine, triethylene tetramine, propylene diamine, di(heptamethylene)triamine, tripropylene tetramine, tetraethylene pentamine, trimethylene diamine, pentaethylene hexamine, di(trimethylene)triamine, 2-heptyl-3-(2-aminopropyl)imidazoline, 4-methylimidazoline, 1,3-bis-(2-aminopropyl)imidazoline, pyrimidine, 1-(2-aminopropyl)piperazine, 1,4-bis(2-amino-ethyl)piperazine, N,N'-dimethyaminopropyl amine, N,N'-dioctylethyl amine, N-octyl-N'-methylethylene diamine, 2-methyl-1-(2-aminobutyl)piperazine, etc. Other higher homologs which may be used can be obtained by condensing two or more of the above-mentioned alkylene amines in a known manner.

The ethylene amines which are particularly useful are described, for example, in the Encyclopedia of Chemical Technology under the heading of "Ethylene Amines" (Kirk and Othmer), Volume 5, pgs. 898–905; Interscience Publishers, New York (1950), incorporated herein by reference. These compounds are prepared by the reaction of an alkylene chloride with ammonia. This results in the production of a complex mixture of alkylene amines, including cyclic condensation products such as piperazines. While mixtures of these amines may be used for purposes of this invention, it is obvious that pure alkylene amines may be used with complete satisfaction.

The polyoxyalkylene polyamines of formulae II and IV, preferably polyoxyalkylene diamines and polyoxyalkylene triamines, may have average molecular weights ranging from about 200 to about 4000 and preferably from about 400 to about 2000. The preferred polyoxyalkylene polyamines include the polyoxyethylene and the polyoxypropylene diamines and the polyoxypropylene triamines having average molecular weights ranging from about 200 to 2000. The polyoxyalkylene polyamines are commercially available and may be obtained, for example, from the Jefferson Chemical Company, Inc. under the tradename "Jeffamines D-230, D-400, D-1000, D-2000, T-403", etc.

THE ALDEHYDE MATERIAL

The aldehyde reactants employed in preparing the materials of this invention will generally comprise formaldehyde or paraformaldehyde, although it will be understood that other aldehyde-group containing compounds, such as $C_2$ to $C_{10}$ hydrocarbyl aldehydes (e.g., butyraldehyde, acetaldehyde, propionaldehyde, and the like) can also be employed. A preferred group of aldehyde materials are compounds of the formula: R"CHO, wherein R" is H, aliphatic hydrocarbon radical (e.g., having from 1 to 4 carbon atoms).

THE HYDROXY AROMATIC REACTANTS

The aromatic reactants useful in the present invention comprises hydroxy aromatic compounds. A hydroxy aromatic compound is an aromatic compound including an aryl ring: naphthalene, anthracene or preferably a benzene ring bearing at least one phenol —OH group. It also includes at least one and preferably two hindering R groups adjacent to the phenol hydroxy group. Typically hindering groups include bulky group typified by t-butyl or t-amyl. Presence of such groups contributes anti-oxidant ability to the resultant product.

It is a feature of these aromatics that they contain an active hydrogen which will be the site for reaction and that they contain hindering or blocking groups (at least one and typically two) in positions adjacent to the —OH group. At least one position which may be meta-, but which is preferably ortho-or para- to the aromatic hydroxy group, must be occupied by an active hydrogen as this is the point of reaction with the aldehyde group.

Commonly the hindering groups may be lower ($C_1$ to $C_{10}$) alkyl groups and most commonly they will be groups which occupy a substantial volume of space. Typically hindering groups may be isopropyl, isobutyl, t-butyl, isoamyl, t-amyl, etc. Hindered phenols which are most readily available commercially include t-butyl groups.

These hindering R groups may be alkyl, alkaryl, aralkyl, cycloalkyl, aryl, etc., groups. In the above compound, R may be typically a hydrocarbon group selected from the group consisting of alkyl, aralkyl, cycloalkyl, aryl and alkaryl including such radicals when inertly substituted. When R is alkyl, it may be typically methyl, ethyl, n-propyl, iso-propyl, n-butyl, i-butyl, sec-butyl, amyl, octyl, decyl, octadecyl, etc. When R is aralkyl, it may typically be benzyl, betaphenylethyl, etc. When R is cycloalkyl, it may typically be cyclohexyl, cycloheptyl, cyclooctyl, 2-methylcycloheptyl, 3-butyl-cyclohexyl, 3-methylcyclo-hexyl, etc. When R is aryl, it may typically be tolyl, xylyl, etc. The preferred R groups may be lower alkyl, i.e., $C_1$–$C_{10}$ alkyl groups including e.g., methyl, ethyl, n-propyl, i-propyl, butyls, amyls, hexyls, octyls, decyls, etc.

Commonly R is a branched chain alkyl group containing about 1–10 carbon atoms. R may, for example, be isopropyl, t-butyl, sec-butyl, isobutyl, sec-amyl, t-amyl, isoamyl, and corresponding branched hexyl, heptyl, octyl, decyl, etc. Both R groups are commonly the same. Preferred R groups may be branched chain alkyl groups containing 1–10, say 3–8 carbon atoms. Most preferred is t-butyl. Preferred herein are hydroxy aromatic compounds of the formula:

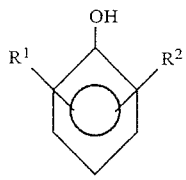

wherein $R^1$ and $R^2$ are independently selected from the group consisting of —OH or $C_1$ to $C_{24}$ hydrocarbyl.

Exemplary of the hydroxy aromatic reactants useful in this invention are:
2,6-di-t-butylphenol, 2,6-di-t-amylphenol, 2,6-di-isobutylphenol, 2,6-di-methylphenol.

The most preferred hydroxy aromatic compound is 2,6-di-t-butylphenol.

THE DICARBOXYLIC ACID MATERIAL

The hydrocarbyl substituted dicarboxylic acid material (E) which is optionally used to make the multifunctional viscosity index improver-antioxidant of the instant invention includes the reaction product of $C_8$ to $C_{500}$ hydrocarbon, preferably long chain hydrocarbon polymer, generally a polyolefin, with (i) monounsaturated $C_4$ to $C_{10}$ dicarboxylic acid wherein (a) the carboxyl groups are vicinyl, i.e., located on adjacent carbon atoms, and (b) at least one, preferably both, of said adjacent carbon atoms are part of said mono unsaturation; or with (ii) derivatives of (i) such as anhydrides or $C_1$ to $C_5$ alcohol derived mono- or diesters of (i). Upon reaction with the hydrocarbon polymer, the monounsaturation of the dicarboxylic acid, anhydride, or ester becomes saturated. Thus, for example, maleic anhydride becomes a hydrocarbyl substituted succinic anhydride.

Typically, from about 0.5 to about 3, preferably from about 0.7 to about 2, and more preferably from about 1.0 to about 2.0 moles of said unsaturated $C_4$ to $C_{10}$ dicarboxylic acid, anhydride or ester are charged to the reactor per mole of polyolefin charged.

Exemplary of such unsaturated mono and dicarboxylic acids, or anhydrides and esters thereof are fumaric acid, itaconic acid, maleic acid, maleic anhydride, chloromaleic acid, chloromaleic anhydride, acrylic acid, methacrylic acid, crotonic acid, cinnamic acid, etc.

Preferred olefin polymers for reaction with the unsaturated dicarboxylic acid, or anhydride are polymers comprising a major molar amount of $C_2$ to $C_{28}$, e.g. $C_2$ to $C_5$, monoolefin. Such olefins include ethylene, propylene, butene, isobutylene, pentene, octene-1, styrene, etc. The polymers can be homopolymers such as polybutene, as well as copolymers of two or more of such olefins such as copolymers of: ethylene and propylene; butylene and isobutylene; propylene and isobutylene; etc. Other copolymers include those in which a minor molar amount of the copolymer monomers, e.g., 1 to 10 mole %, is a $C_4$ to $C_{18}$ non-conjugated diolefin, e.g., a copolymer of isobutylene and butadiene; or a copolymer of ethylene, propylene and 1,4-hexadiene; etc.

In some cases the olefin polymer may be completely saturated, for example an ethylene-propylene copolymer made by a Ziegler-Natta synthesis using hydrogen as a moderator to control molecular weight.

The olefin polymers will usually have number average molecular weights (Mn) within the range of about 400 and about 10,000, preferably between about 400 to 5000, and more preferably between about 600 and about 2500. Particularly useful olefin polymers have number average molecular weights within the range of about 800 and about 1100 with approximately one terminal double bond per polymer chain. An especially useful starting material for the high functionality long chain hydrocarbyl substituted dicarboxylic acid producing material of this invention is poly(butene) or poly(C4-alkene), e.g., poly(n-butene), polyisobutylene, and mixtures thereof.

Processes for reacting the olefin polymer with the $C_4-C_{10}$ unsaturated dicarboxylic acid, anhydride or ester are known in the art. For example, the olefin polymer and the dicarboxylic acid material may be simply heated together as disclosed in U.S. Pat. Nos. 3,361,673 and 3,401,118 to cause a thermal "ene" reaction to take place. Alternatively, the olefin polymer can be first halogenated, for example, chlorinated or brominated to about 1 to 8, preferably 3 to 7 wt. % chlorine or bromine, based on the weight of polymer, by passing the chlorine or bromine through the polyolefin at a temperature of 60° to 160° C., e.g., 110° to 130° C., for about 0.5 to 10, preferably 1 to 7 hours. The halogenated polymer may then be reacted with o sufficient unsaturated acid or anhydride at 100° to 250° C., usually about 180° to 235° C., for about 0.5 to 10 hours, e.g., 3 to 8 hours. Processes of this general type are taught, inter alia, in U.S. Pat. Nos. 3,087,436; 3,172,892; 3,272,746; and U.S. patent application Ser. No. 919,395, filed Oct. 16, 1986, all of which are incorporated herein by reference.

Alternatively, the olefin polymer and the unsaturated acid material are mixed and heated while adding chlorine to the hot material. Processes of this type are disclosed in U.S. Pat. Nos. 3,215,707; 3,231,587; 3,912,764; 4,110,349; 4,234,435; and in U.K. 1,440,219.

The most preferred long chain hydrocarbyl substituted dicarboxylic acid material is polyisobutenyl succinic anhydride having a functionality of from 1.2 to about 2.0, preferably from about 1.3 to about 1.9, and more preferably from about 1.4 to about 1.8.

PREPARATION OF PRODUCTS

In accordance with one embodiment, the grafted ethylene copolymer (A), amine (B) and hydrocarbyl substituted dicarboxylic acid material (E) are reacted (in any order) to form an amine-substituted grafted ethylene copolymer adduct (I-1) having reactive amino groups and beating substituent groups derived from the hydrocarbyl substituted dicarboxylic acid material. The adduct (I-1) can then be contacted with aldehyde (C) and hydroxy aromatic reactant (D) under condensation reaction conditions to form a reaction product (I-2) wherein the hydroxy aromatic reactants are attached to the nitrogen atoms of the adduct (I-1) through the residue of the aldehyde employed, e.g., —CH(CH$_3$)— in the case of CH$_3$CHO.

The grafted ethylene copolymer, preferably in solution generally equal to about 5 to 30 wt. %, preferably 10 to 20 wt. % polymer, can be readily reacted with a mixture of amine and hydrocarbyl substituted dicarboxylic acid material by heating said mixture at a temperature of from about 100° C. to 250° C., preferably from 150° to 200° C., for from 0.1 to 10 hours, usually about 0.5 to about 3 hours. The heating is preferably carried out to favor formation of imides rather than amides and salts. Thus, imide formation will give a lower viscosity of the reaction mixture than amide formation and particularly lower than salt formation. This lower viscosity permits the utilization of a higher concentration of grafted ethylene copolymer in the reaction mixture. Removal of water, e.g., by N$_2$ stripping during slow addition of the amine with stirring assures completion of the imidation reaction. Reaction ratios can vary considerably, depending upon the reactants, amounts of excess, type of bonds formed, etc. The amount of polyamine used is an amount effective to enhance or improve the dispersant properties of the compounds of the instant invention. Generally, the amount of polyamine used is an amount which is effective to provide from about 0.5 to about 1.5 equivalents, preferably from about 0.8 to about 1.2 equivalents, and more preferably from about 0.9 to about 1.0 equivalents of primary amine per equivalent of acid of the grafted dicarboxylic acid moiety, e.g., succinic anhydride.

The amount of hydrocarbyl substituted dicarboxylic acid material utilized is an amount which is effective to prevent cross-linking or excessive chain-extension of the grafted ethylene copolymer during amination/imidation thereof. Generally this amount is from about 0.3 to about 1.2, preferably from about 0.6 to about 1.2, more preferably from about 0.9 to about 1.1 mole equivalents of the hydrocarbyl substituted dicarboxylic acid material per mole of the grafted dicarboxylic acid moiety content, e.g., grafted maleic anhydride content, of the grafted ethylene copolymer and solvent, if any, such as oil.

Alternatively, the polyamine and the hydrocarbyl substituted dicarboxylic acid material may be pre-reacted to form an amine-acid adduct, and this adduct may then be reacted with the grafted ethylene copolymer. In the case of the amine-acid adduct the acid moiety of the hydrocarbyl substituted dicarboxylic acid material is generally attached to the polyamine moiety through salt, imide, amide, amidine, ester or other linkages formed with one primary amine group of said polyamine so that another primary amine group of the polyamine is still available for reaction with the acid o moieties of the grafted ethylene copolymer.

Usually, these adducts are made by condensing the hydrocarbyl substituted dicarboxylic material, preferably a succinic acid producing material such as alkenyl succinic anhydride, with a polyamine including those described above under "The Amines".

Formation of dicarboxylic acid polyamine adduct by reaction of polyamine with alkenyl succinic anhydride prepared from the reaction of a polyolefin or chlorinated polyolefin and maleic anhydride, etc., is well known in the art, as seen in U.S. Pat. No. 3,272,746.

Most preferred are the adducts made by reaction of the aforesaid alkylene polyamines, previously described, with a high functionality long chain polyalkenyl succinic anhydride.

Reaction, in the case of a polyamine, preferably amination and/or imidation of the hydrocarbyl substituted dicarboxylic acid material is usefully done as a solution reaction with said dicarboxylic acid material, usually polyisobutenylsuccinic anhydride, dissolved in a solvent such as mineral oil, to which the other reactant is added. The formation of the adducts in high yield can be effected by adding from about 0.5 to 3.3 preferably about 0.7 to 1.3, most preferably about 1 molar proportion of the alkylene polyamine per molar proportion of alkenyl succinic anhydride to said solution and heating the mixture at 140° C. to 165° C. or higher until the appropriate amount of water of reaction is evolved. Typically the mineral oil solvent is adjusted so that it constitutes 50% by weight of the final acyl nitrogen compound solution.

Another, and generally preferred, method of making the amine-substituted grafted ethylene copolymer adduct (I-1) employed in the instant invention is a sequential reaction process comprising (i) forming the grafted ethylene copolymer, (ii) adding to said grafted ethylene copolymer the hydrocarbyl substituted dicarboxylic acid material so as to form a mixture of said grafted ethylene copolymer and said hydrocarbyl substituted dicarboxylic acid material, and (iii) reacting this mixture with the polyamine.

The amine-substituted grafted ethylene copolymer adduct (I-1) is reacted with the aldehyde and hydroxy aromatic reactant in accordance with this invention by contacting in a reaction zone. The reactants are contacted for a time and under conditions effective to react the aldehyde, reactive amine groups of the amine-substituted grafted ethylene copolymer adduct (I-1) and the C-H groups of the hydroxy aromatic reactant to form a Mannich Base condensation product containing hydroxy aromatic units bound to at least a portion of the amine-substituted grafted ethylene copolymer adduct (I-1) through a hydrocarbylene group derived from the aldehyde (e.g., a methylene (—$CH_2$—) group derived from formaldehyde).

The conditions of temperature and pressure under which the reaction occurs can vary widely, and generally temperatures of from about 0° to 200° C., preferably from about 25° to 150° C. Temperatures of less than 0° C. can be used but undesirably slow reaction rates can result. Reaction temperatures of greater than 200° C., up to the decomposition point of the reactants or reaction products, can also be employed, with the attendant formation of by-products. The pressures in the reaction zone will be sufficient to maintain a liquid reaction medium, and generally pressures from about 0.1 to 1000 kPa, and preferably from about 1 to 100 kPa, will be employed.

The reaction can be carried out in a batchwise, continuous or semicontinuous manner, in one or more reaction zones. The reaction can be conducted in any conventional apparatus such as stirred tank reactors, tubular flow reactors and the like.

The reactants can be charged to the reaction zone continuously or intermittently, together or sequentially, in any order. Generally, the amine-substituted grafted ethylene copolymer adduct (I-1 ) and any solvent for the reaction will be first charged to the reaction zone, followed by aldehyde reactant, and then by addition of the hydroxy aromatic reactant, which can, if desired, be introduced to the reaction zone as a mixture of the aldehyde and hydroxy aromatic reactants. Preferably, the amine-substituted grafted ethylene copolymer adduct (I-1) is contacted with the hydroxy aromatic reactant before the aldehyde reactant at reaction conditions.

The process of the present invention can be accomplished using a wide range of ratios of reactants, and the amine-substituted grafted ethylene copolymer adduct (I-1): aldehyde reactant: hydroxy aromatic reactant will generally be charged in a ratio of from 1:0.001:0.001 to 1:10:10, preferably from 1:0.005:0.005 to 1:5:5, and more preferably from 1:0.01:0.01 to 1:1.0:1.0, molar equivalents of amine-substituted grafted ethylene copolymer adduct (I-1):moles of aldehyde reactant:moles of hydroxy aromatic reactant.

The reaction can be conducted in the absence, or in the presence, of a diluent or solvent for the amine-substituted grafted ethylene copolymer adduct (I-1 ). Suitable solvents include mineral and synthetic lubricating oils, and hydrocarbon solvents such as aliphatics, cycloaliphatics, and aromatic hydrocarbon solvents, or halogenated versions of such solvents. The most preferred solvent is mineral lubricating oil. Non-limiting illustrative examples of diluents or solvents are butane, pentane, hexane, heptane, cyclopentane, cyclohexane, cycloheptane, methyl cyclopentane, methyl cyclohexane, isooctane, benzene, toluene, xylene, chloroform, chlorobenzenes, tetrachloroethylene, dichloroethane and trichloro-ethane.

The reaction time can vary widely, and will depend on such factors as the amount of reactants employed, the size of the reaction vessel, the temperature and other factors. Generally, the reaction time will range from about 0.5 to 48 hours, and more typically from 2 to 12 hours.

Generally, from 20 to 90 wt. % (and preferably from 25 to 75 wt. %) of the N atoms in the amino-substituted polymer will be primary and/or secondary, and therefore reactive with the aldehyde and hydroxy aromatic reactants, and preferably at least about 1 wt. % of the reactive N atoms (e.g., from 1 to about 100 wt. %), more preferably at least about 20 wt. % (e.g., from 20 to about 80 wt. %) and most preferably from 25 to 75 wt. % of the reactive N atoms in the amino-substituted polymer will be reacted with the aldehyde and hydroxy aromatic reactant to form >N-ald-hydroxy aromatic group (wherein "ald" is the linking unit derived from the aldehyde reactant and "hydroxy aromatic" is the hydroxy aromatic reactant).

A minor amount, e.g., 0.001 up to 50 wt. %, preferably 0.005 to 25 wt. %, based on the weight of the total composition, of the oil-soluble functionalized graft ethylene copolymers produced in accordance with this invention can be incorporated into a major amount of an oleaginous material, such as lubricating oil or hydrocarbon fuel, depending upon whether one is forming finished products or additives concentrates. When used in lubricating oil compositions, e.g., automotive or diesel crankcase lubricating oil, the nitrogen-containing or grafted polymer concentrations are usually within the range of about 0.01 to 10 wt. %, e.g., 0.1 to 6.0 wt. %, preferably 0.25 to 3.0 wt. %, of the total composition. The lubricating oils to which the products of this invention can be added include not only hydrocarbon oil derived from petroleum, but also include synthetic lubricating oils such as esters of dibasic acids; complex esters made by esterification of monobasic acids, polyglycols, dibasic acids and alcohols; polyolefin oils, etc.

The multi-functional viscosity index improvers of the instant invention may be utilized in a concentrate form, e.g., from about 5 wt. % up to about 50 wt. %, preferably 7 to 25 wt. %, in oil, e.g., mineral lubricating oil, for ease of handling, and may be prepared in this form by carrying out the reaction of the invention in oil as previously discussed.

The compositions produced in accordance with the present invention have been found to be particularly useful as fuel and lubricating oil additives.

Accordingly, while any effective amount of these additives can be incorporated into a fully formulated lubricating oil composition, it is contemplated that such effective amount be sufficient to provide said lube oil composition with an amount of the additive of typically from 0.01 to about 10, e.g., 0.1 to 6.0, and preferably from 0.25 to 3.0 wt. %, based on the weight of said composition.

Natural base oils used in the practice of this invention include mineral lubricating oils which may vary widely as to their crude source, e.g., whether paraffinic, naphthenic, mixed, paraffinic naphthenic, and the like; as well as to their formation, e.g., distillation range, straight run or cracked, hydrofined, solvent extracted and the like.

More specifically, the natural lubricating oil base stocks which can be used in the compositions of this invention may be straight mineral lubricating oil or distillates derived from paraffinic, naphthenic, asphaltic, or mixed base crudes, or, if desired, various blends oils may be employed as well as residuals, particularly those from which asphaltic constituents have been removed.

The lubricating oil base stock conveniently has a viscosity of typically about 2.5 to about 12, and preferably about 2.5 to about 9 cSt. at 100° C.

Thus, the additives of the present invention can be employed in a lubricating oil composition which comprises lubricating oil, typically in a major amount, and the additive, typically in a minor amount, which is effective to impart enhanced dispersancy relative to the absence of the additive. Additional conventional additives selected to meet the particular requirements of a temperatures. In this form the additive per se is thus being utilized as a 100% active ingredient form which can be added to the oil or fuel formulation by the purchaser. Alternatively, these additives may be blended with suitable oil-soluble solvent and base oil to form concentrate, which may then be blended with a lubricating oil base stock to obtain the final formulation. Concentrates will typically contain from about 2 to 80 wt. %, by weight of the additive, and preferably from about 5 to 40% by weight of the additive.

The lubricating oil base stock for the additive of the present invention typically is adapted to perform selected function by the incorporation of additives therein to form lubricating oil compositions (i.e., formulations).

Representative additives typically present in such formulations include other viscosity modifiers, corrosion inhibitors, oxidation inhibitors, friction modifiers, other dispersants, anti-foaming agents, anti-wear agents, pour point depressants, detergents, rust inhibitors and the like.

In the following Examples, thickening efficiency (T.E.) is defined as the ratio of the weight percent of a polyisobutylene (sold as an oil solution by Exxon Chemical Co. as Paratone N), having a Staudinger Molecular Weight of 20,000 required to thicken a solvent-extracted neutral mineral lubricating oil, having a viscosity of 150 SUS at 37.8° C., a viscosity index of 105 and an ASTM pour point of 0° F., (Solvent 150 Neutral) to a viscosity of 12.4 centistokes at 98.9° C., to the weight percent of a test copolymer required to thicken the same oil to the same viscosity at the same temperature. T.E. is related to (Mn) and is a convenient, useful measurement for formulation of lubricating oils of various grades.

The storage stability tests in the following Examples were conducted by storing 200 grams of the product in a pint bottle in an oven at 80° C. and then periodically measuring the viscosity at 100° C. in terms of centistokes. The viscosity is measured at the end of three week periods and calculated as the % per hour increase in centistoke viscosity.

EXAMPLE 1

Preparation of Non-Capped Imide Grafted Ethylene-Propylene Copolymer

In a 1 liter four neck round bottom flask equipped with stirrer, thermometer, nitrogen inlet and nitrogen outlet 500 grams of 20 wt. % oil solution of an ethylene-propylene copolymer in S100N (Solvent 100 Neutral mineral oil) was charged. The solution was heated to 150° C. under nitrogen blanket and the temperature was held at 150° C. throughout the reaction. The polymer in oil concentrate was stripped with $N_2$ for 1 hour to eliminate water from the solution. The concentrate was then reacted with maleic anhydride (9 g) and ditertiary butyl peroxide (0.9 g) which were added in three stages at 20 min. intervals. The grafted product was stripped with $N_2$ for 2 hours at 150° C. to remove the unreacted maleic anhydride, and was found to have a graft level of 0.118 milliequivalent of succinic anhydride per gram of grafted material. To this solution was then added 139.44 grams of a 50 wt. % oil solution of polyisobutenyl succinic anhydride (P1BSA) having a functionality of about 1.05 (a polyisobutene Mn of about 950, a saponification number of 112 and about 12 wt. % unreacted polyisobutene) in S 100NLP base oil. The resultant mixture was $N_2$ stripped for 0.5 hour and 5.73 grams of diethylenetriamine were added to this reaction mixture over a period of 15 minutes. The product was then $N_2$ stripped for one hour. The product was analyzed to contain 0.26 wt. % N, and was found to have a TE of 1.97.

Part of the product (33.95 grams) was then diluted with an amount of S100N mineral oil sufficient to reduce the viscosity of the reaction mixture to about 815 centistokes at 100° C.

The kinematic viscosity (K.V.) of this diluted mixture was measured at 100° C., both initially and after storage for three weeks at 80° C. The results are given in Table 1.

EXAMPLE 2

Preparation of a 2,6-di-t-butylphenol Reacted Imide Grafted Ethylene-Propylene Copolymer A reaction flask (as used in Example 1) was charged with 300 grams of the imide grafted ethylene-propylene copolymer product prepared in accordance with the procedure of Example 1 and was heated to 80° C. under nitrogen blanket. An aqueous solution (1.2 ml.) of 37% formaline (0.15 mole) was added to the above polymeric solution, and 3.00 g (0.015 mole) 2,6-di-t-butylphenol was then added as a 30 wt. % solution in ethanol. The solution was stirred at 120° C. for one hour and the temperature was raised to 120° C. and then stripped with nitrogen for one hour. Part of the product was diluted as in Example 1 to reduce the viscosity of the reaction mixture to 809 cSt at 100° C.

The product thereby obtained was analyzed, and its IR spectra showed characteristic absorption peaks due to hydroxy group along with peaks due to the amine-substituted grafted ethylene copolymer. The product appeared free of haze.

The kinematic viscosity (K.V.) of this diluted product was measured at 100° C., both initially and after storage for three weeks at 80° C. The results are given in Table 1.

TABLE 1

| | | (Products stored at 80° C.) | | |
|---|---|---|---|---|
| Example No. | Initial Viscosity (cSt) | Viscosity after 3 Weeks (cSt) | Change in Viscosity (cSt) (1) | Average Viscosity Increase %/Hour (2) |
| 1 | 815 | 1016 | +201 | +0.037 |
| 2 | 809 | 732 | −77 | −0.014 |

(1) (viscosity, 3 wks.) − (initial viscosity).
(2) [(change in viscosity)/(initial viscosity)] [100]/(504 hrs.)

The 2,6-di-t-butylphenol Mannich base polymer product of Example 2 was then tested for sludge inhibition (via the SIB test) and varnish inhibition (via the VIB test), as described below as was the product of Example 1.

The SIB test has been found, after a large number of evaluations, to be an excellent test for assessing the dispersing power of lubricating oil dispersant additives.

The medium chosen for the SIB test was a used crankcase mineral lubricating oil composition having an original viscosity of about 325 SUS at 38° C. that had been used in a taxicab that was driven generally for short trips only, thereby causing a o buildup of a high concentration of sludge precursors. The oil that was used contained only a refined base mineral lubricating oil, a viscosity index improver, a pour point depressant and zinc dialkyldithiophosphate anti-wear additive. The oil contained no sludge dispersant. A quantity of such used oil was acquired by draining and refilling the taxicab crankcase at 1000-2000 mile intervals.

The SIB test was conducted in the following manner: the aforesaid used crankcase oil, which was milky brown in color, was freed of sludge by centrifuging for one hour at about 39,000 gravities (gs.). The resulting clear bright red supernatant oil was then decanted from the insoluble sludge particles thereby separated out. However, the supernatant oil still contained oil-soluble sludge precursors which on heating under the conditions employed by this test will tend to form additional oil-insoluble deposits of sludge. The sludge inhibiting properties of the additives being tested were determined by adding to portions of the supernatant used oil, a small amount of the particular additive being tested. Ten grams of each blend being tested were placed in a stainless steel centrifuge tube and were heated at 135° C. for 16 hours in the presence of air. Following the heating, the tube containing the oil being tested was cooled and then centrifuged for about 30 minutes at room temperature at about 39,000 gs. Any deposits of new sludge that form in this step were separated from the oil by decanting the supernatant oil and then carefully washing the sludge deposits with 25 ml of heptane to remove all remaining oil from the sludge and further centrifuging. The weight of the new solid sludge that forms in the test, in milligrams, was determined by drying the residue and weighing it. The results were reported as amount of precipitated sludge in comparison with the precipitated sludge of a blank now containing any additional additive, which blank was normalized to a rating of 10. The less new sludge precipitated in the presence of the additive, the lower the SIB value and the more effective was the additive as a sludge dispersant. In other words, if the additive gave half as much precipitated sludge as the blank, then it would be rated 5.0 since the blank will be normalized to 10.

The VIB test was used to determine varnish inhibition. Here, each test sample consists of 10 grams of lubricating oil containing a small amount of the additive being tested. The test oil to which the additive was admixed was of the same type as used in the above-described SIB test. Each ten gram sample was heat soaked overnight at about 140° C. and thereafter centrifuged to remove the sludge. The supernatant fluid of each sample was subjected to heat cycling from about 150° C. to room temperature over a period of 3.5 hours at a frequency of about 2 cycles per minute. During the heating phase, gas which was a mixture of about 0.7 volume percent $SO_2$, 1.4 volume percent NO and balance air was bubbled through the test samples. During the cooling phase, water vapor was bubbled through the test samples. At the end of the test period, which testing cycle can be repeated as necessary to determine the inhibiting effect of any additive, the wall surfaces of the test flasks in which the samples are contained are visually evaluated as to the varnish inhibition. The amount of varnish imposed on the walls was rated to values of from 1 to 11 with the higher number being the greater amount of varnish, in comparison with a blank with no additive that is rated 11.

10.00 grams of SIB test oil are mixed with the indicated amount of the products of Examples 1 & 2 and tested in the aforedescribed SIB and VIB tests. The data thereby obtained are summarized in Table II below.

SIB/VIB DATA

The sludge and varnish dispersancies of the products described above in Examples 1 and 2 were evaluated in our SIB/VIB bench test and the results are as follows:

TABLE II

| Example No. | SIB, mg | VIB Rating |
|---|---|---|
| 1 | 5.57 | 3 |
| 2 | 3.29 | 3+ |
| Ref. Taxi 170 | 10.00 | 11 |

What is claimed is:

1. Oil soluble additive, useful as a viscosity index improver-dispersant exhibiting improved antioxidant properties for oleaginous compositions, comprising the reaction products of:
   (a) an oil soluble ethylene copolymer comprising from about 15 to 90 wt. % ethylene and from about 10 to 85 wt. % of at least one $C_3$ to $C_{28}$ alpha-olefin, having a number average molecular
   weight of from about 20,000 to 500,000, grafted with an ethylenically unsaturated carboxylic acid material having 1 or 2 acid or anhydride moieties;
   (b) organic polyamine having at least two primary amino groups;
   (c) an aldehyde;
   (d) a hydroxy aromatic reactant containing at least one —OH group attached to the aromatic ring; and
   (e) a hydrocarbyl substituted dicarboxylic acid material.

2. The additive according to claim 1 wherein said hydrocarbyl dicarboxylic acid material comprises a polyalkenyl substituted succinic acid or anhydride, wherein said polyalkenyl group has a number average molecular weight of from about 400 to about 10,000, and wherein said polyalkenyl is derived from at least one $C_2$ to $C_{18}$ monoolefin.

3. The additive according to claim 1 wherein (b) is a polyamine, said polyamine being an alkylene or oxyalkylene polyamine having at least two primary amine groups selected from the group consisting of alkylene polyamines having alkylene groups of about 2 to 7 carbon atoms and 2 to 11 nitrogens, and polyoxyalkylene polyamines, wherein the alkylene groups contain 2 to 7 carbon atoms and the number of oxyalkylene groups is about 3 to 70.

4. The additive according to any of claims 1, 3 or 4 wherein said hydroxy aromatic reactant comprises a compound of the formula

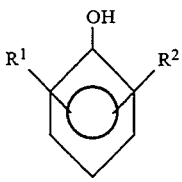

wherein $R^1$ and $R^2$ are independently selected from the group consisting of —OH, or $C_1$ to $C_{24}$ hydrocarbyl.

5. The additive according to any of claims 1, 3 or 4 wherein said (c) comprises at least one of formaldehyde and paraformaldehyde.

6. The additive according to claim 4 wherein said (d) comprises at least one of 2,6-di-t-butylphenol and 2,6-dimethylphenol.

7. An oleaginous composition exhibiting improved antioxidant properties comprising a major proportion of oil selected from lubricating oil and fuel oil and a minor amount of a viscosity index improver-dispersant additive comprising the reaction products of (a) oil soluble ethylene copolymer comprising from about 15 to 90 wt. % ethylene and from about 10 to 85 wt. % of at least one $C_3$ to $C_{28}$ alpha-olefin, having a number-average molecular weight of from about 20,000 to 500,000, grafted with an ethylenically unsaturated mono- or dicarboxylic acid or anhydride;

(b) organic polyamine having at least two primary amino groups;

(c) an aldehyde;

(d) a hydroxy aromatic reactant containing at least one —OH group attached to the aromatic ring; and (e) a hydrocarbyl substituted dicarboxylic acid material.

8. The oleaginous composition according to claim 7 which is a lubricating oil composition containing from about 0.01 to 15 wt. % of said additive.

9. A process for preparing viscosity index improver-dispersant additive exhibiting improved low temperature viscometric properties comprising (i) grafting oil soluble ethylene copolymer having a number average molecular weight of from about 20,000 to 500,000 and comprising about 15 to 90 wt. % ethylene and about 10 to 85 wt. % of at least one $C_3$ to $C_{28}$ olefin in an oil solution with at least one olefinically unsaturated dicarboxylic acid or anhydride using a free radical initiator at a temperature of about 150 to about 220 Deg. C.; (ii) mixing with the grafted ethylene copolymer at least one hydrocarbyl substituted dicarboxylic acid material to form a reaction mixture; (iii) reacting with said reaction mixture at least one polyamine containing at least two primary amino groups to form an amine-substituted grafted ethylene copolymer adduct having reactive amino groups, and (iv) reacting said adduct with at least one aldehyde and at least one hydroxy aromatic reactant containing at least one —OH group attached to the aromatic ring, to form said additive.

* * * * *

UNITED STATES PATENT AND TRADEMARK OFFICE
CERTIFICATE OF CORRECTION

PATENT NO. : 5,439,607
DATED : August 8, 1995
INVENTOR(S) : A.O.Patil

It is certified that error appears in the above-indentified patent and that said Letters Patent is hereby corrected as shown below:

In Column 3, line 26, delete "gratis" and insert --grafts--.
In Column 12, line 40, delete "aid" and insert --ald--.

Signed and Sealed this

Sixteenth Day of July, 1996

Attest:

BRUCE LEHMAN

Attesting Officer    Commissioner of Patents and Trademarks